United States Patent

[11] 3,601,146

| [72] | Inventors | Alan B. Reighard |
| | | Bay Village; |
| | | John Sharpless, Amherst, both of, Ohio |
| [21] | Appl. No. | 822,878 |
| [22] | Filed | May 8, 1969 |
| [45] | Patented | Aug. 24, 1971 |
| [73] | Assignee | Nordson Corporation |
| | | Amherst, Ohio |

[54] LIQUID LEVEL CONTROL
7 Claims, 8 Drawing Figs.

[52] U.S. Cl. ............................................. 137/413,
137/424, 137/434
[51] Int. Cl. ............................................. G05d 9/00
[50] Field of Search............................................. 137/412,
413, 416, 424, 428, 434; 251/65

[56] References Cited
UNITED STATES PATENTS
2,231,158  2/1941  Davis............................ 137/413 X

| 2,269,846 | 1/1942 | Engel............................. | 137/413 |
| 2,616,440 | 11/1952 | Mason........................... | 137/424 X |
| 2,653,623 | 9/1953 | Hippen et al. ................. | 137/413 |
| 2,790,459 | 4/1957 | Thomas......................... | 137/412 |
| 3,128,784 | 4/1964 | Parks............................. | 137/413 X |
| 3,351,084 | 11/1967 | Halkiades...................... | 137/416 |
| 3,415,268 | 12/1968 | Tweed........................... | 137/413 X |

Primary Examiner—Henry T. Klinksiek
Assistant Examiner—David R. Matthews
Attorney—Bosworth, Sessions, Herrstrom & Cain ABSTRACT: A device for sensing and controlling a liquid level in a reservoir or container. The device uses a counterbalanced sensing element in the form of a displacer adapted to enter the liquid through the surface and displace a certain volume thereof. The displacer is mounted on an arm of the lever, the lever being counterbalanced to respond to a liquid head. The lever also carries a switch-actuating mechanism which is moved in response to change in the liquid level so that the switch controls the supply of liquid to the reservoir to maintain the desired level.

PATENTED AUG 24 1971

INVENTORS.
ALAN B. REIGHARD &
JOHN SHARPLESS
BY *Bosworth, Sessions,
Herrstrom & Cain*
ATTORNEYS

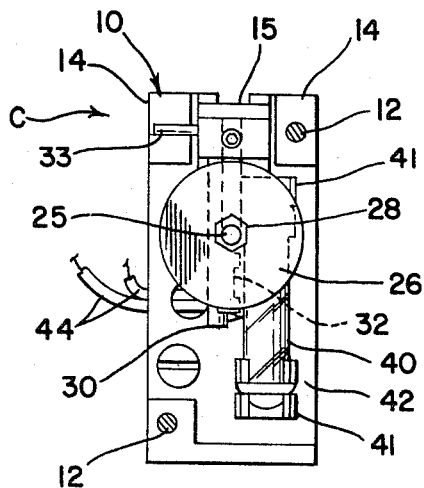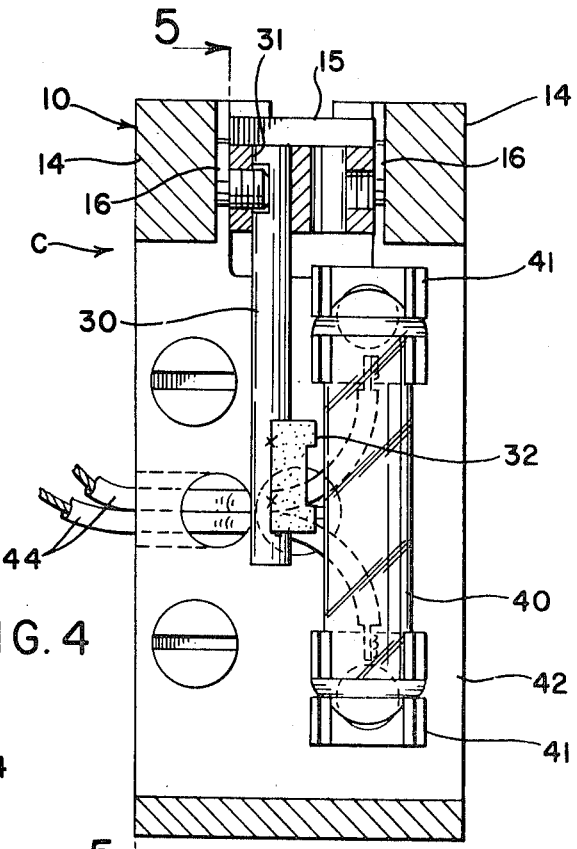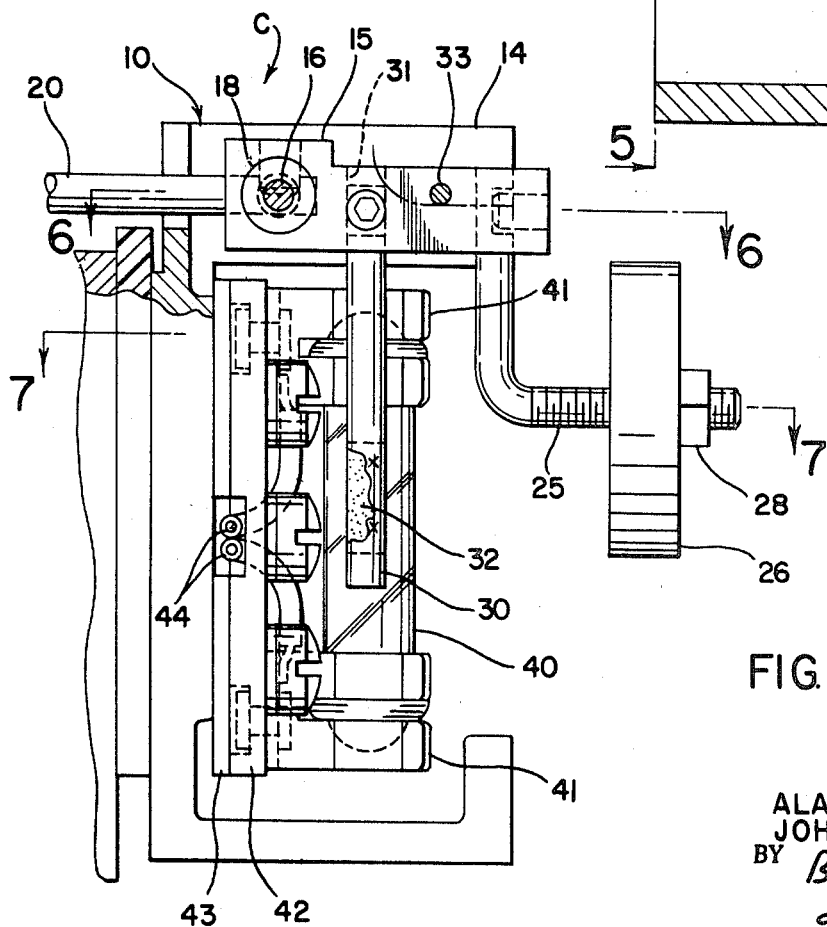

PATENTED AUG 24 1971　　　　　　　　　　　　　3,601,146
SHEET 3 OF 3
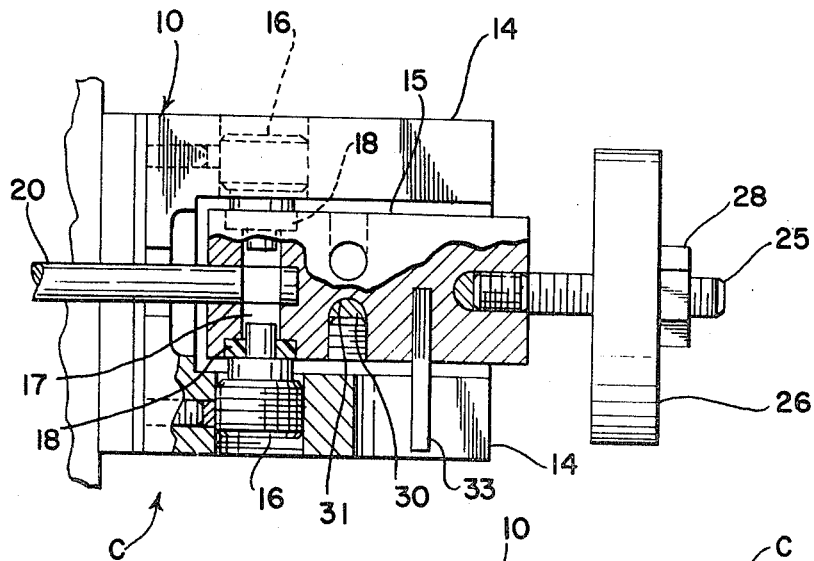
FIG. 6
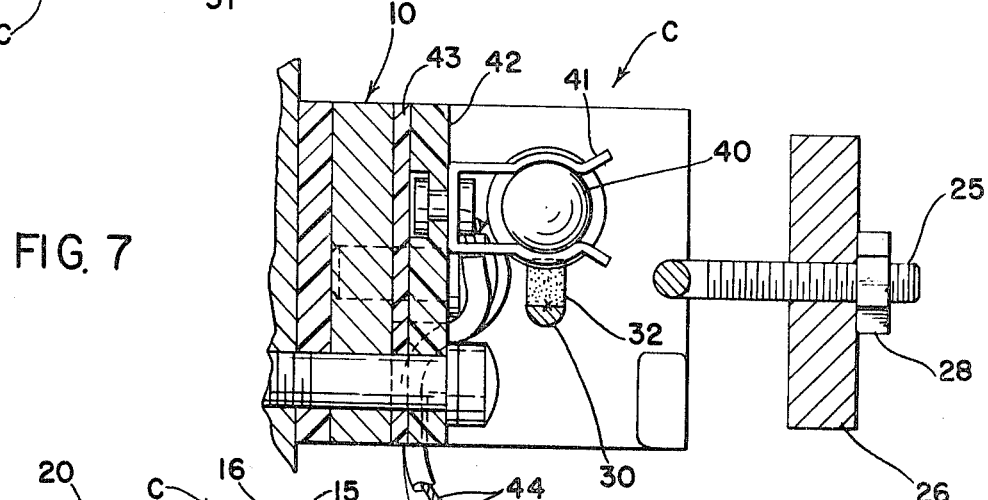
FIG. 7
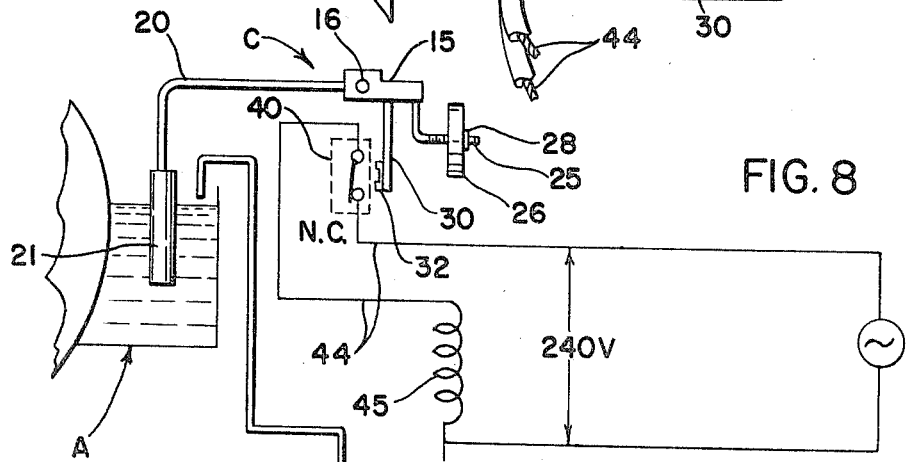
FIG. 8
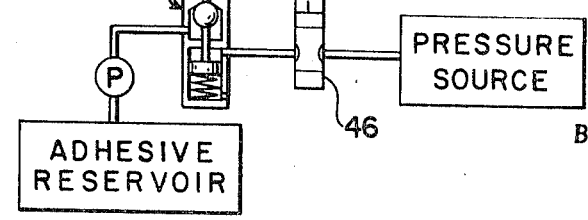
INVENTORS.
ALAN B. REIGHARD &
JOHN SHARPLESS
BY
*Bosworth, Sessions,
Herrstrom & Cain*
ATTORNEYS 3,601,146

LIQUID LEVEL CONTROL

BACKGROUND OF THE INVENTION

This invention relates to liquid level control devices and especially to a device which uses a displacement-type sensor to signal a liquid level condition. More particularly the invention relates to a liquid level control device which may be used with special advantage in connection with highly viscous liquids which may tend to solidify on the surface of the sensing member, and also in connection with liquids which are in a state of considerable agitation in their respective reservoir or container during the operation of associated equipment. One specific application wherein the invention may be used to particular advantage is in connection with equipment for applying molten adhesives. Molten adhesives, often called "hotmelt" adhesives, have many applications in the packaging art, particularly in connection with paper and cardboard-type packaging materials. Such adhesives are particularly preferred where there is a need for a very short "setting time" or in other words a short time interval between application of the adhesive and the completion of the bonding together of parts being adhered or sealed.

Hotmelt adhesives are typically of the asphaltic or synthetic resin type and are generally in their solid state at room temperature. When heated to molten form, however, they change in physical state to a relatively viscous liquid which may be pumped through the nozzle of an applicator tool or gun and applied to a surface, or which may be applied by means of an applicator wheel which during its rotation picks up molten adhesive from an adjacent and contiguous container or gluepot and subsequently deposits the molten adhesive on a surface which translates at the same speed as the surface speed of the applicator wheel.

In the case of the wheel-type applicators, the solid adhesive material is usually heated to a molten state in a heater and then supplied to a reservoir or gluepot wherein the molten adhesive must be maintained at a suitable level to avoid either insufficient or excessive deposits on the applicator wheel.

Accordingly, a level control is necessary in order to assure that the supply of molten adhesive to the reservoir or gluepot is controlled in such a way as to maintain the desired operating level. Such level control devices, however, are presented with several unusual difficulties.

Since the molten adhesive is quite viscous the response of level control devices such as conventional floats is relatively unreliable due to their high sensitivity. Also, a relatively large float is required in order to generate sufficient switch-operating force and most reservoirs or gluepots are relatively small— too small for a float of sufficient buoyant force-generating size. Also floats tend to accumulate solidified or "degraded" molten adhesive which might collect above the normal liquid level line in sufficient quantity to sink the float so that the device would call for more molten adhesive even when the reservoir is full.

Another disadvantage of floats is that they are delicate and expensive to manufacture. A small hole in the float will cause it to sink eventually and cease to function. Also their sensitivity is a particular problem where the liquid is in a state of vigorous agitation, such agitation being common under most service conditions.

Another prior art level control device is the type shown in the U.S. Pat. No. 2,861,159 to Seney. This device is in the form of a temperature-sensing probe extending into a reservoir containing a liquid. When the liquid contacts the probe, heat is transmitted by conduction either to or from the probe depending on the particular circumstance. The probe senses the change in temperature and transmits a signal to a switch to operate a supply valve. This type of device would tend to accumulate molten adhesive eventually, however, and lose its sensitivity. Also the device would be unreliable when used in connection with a liquid in a condition of vigorous agitation.

Still another prior art device used to sense a liquid level in a reservoir or gluepot containing molten adhesive is an air pressure responsive device or in other words a pneumatic device for sensing the back pressure in a confined gluepot. The pressure increases as the liquid level rises and at a predetermined pressure a signal will be transmitted such as through an electrical switch to a control valve. While these devices are effective in many circumstances they are complicated and unreliable under certain service conditions.

The device of the present invention, however, reduces the difficulties indicated above and affords other features and advantages not obtainable from the prior art.

SUMMARY OF THE INVENTION

It is among the objects of the invention to improve the accuracy of the control of the liquid level in a reservoir or container.

Another object is to sense and control the level of the viscous molten adhesive in a gluepot.

Still another object is to accurately sense the level of a viscous liquid while the liquid is in a state of high turbulence.

A further object is to transmit with improved accuracy and reliability a liquid level responsive signal to an electrical switch which actuates a valve that controls the liquid supply.

A still further object is to provide an essentially failsafe liquid level sensing element which works effectively even when a substantial quantity of material solidifies thereon.

These and other objects and advantages are accomplished through the present invention which in its preferred form comprises a liquid level sensing and controlling mechanism including a lever having an axis of pivotal support and an elongated sensing member secured to an arm of the lever adapted to enter and displace the liquid, the sensing member entering through the liquid surface. A counterweight is secured to another arm of the lever in counterbalancing relation to the sensing member. The lever also carries a switch-actuating member which at one position in its travel is effective to operate an electrical switch that in turn controls the liquid level.

According to one embodiment of the invention the switch-operating member is in the form of a magnet which is effective at one position in its path of travel to transmit a switch-actuating force to a magnetic switch.

The displacer or sensing member advantageously takes the form of an elongated element having a length for example of from three to six times its diameter and having a density equal to or greater than that of the liquid. Also the counterweight is preferably adjustable relative to the pivot axis to permit accurate presetting of the desired liquid level and to accommodate liquids of different densities.

BRIEF DESCRIPTION OF THE DRAWINGS

FIG. 3 is a sectional view taken on the line 3—3 of FIG. 2;

FIG. 4 is a sectional view on an enlarged scale taken on the line 4—4 of FIG. 2;

FIG. 5 is a sectional view taken on the line 5—5 of FIG. 4;

FIG. 6 is a sectional view taken on the line 6—6 of FIG. 5;

FIG. 7 is a sectional view taken on the line 7—7 of FIG. 5; and

FIG. 8 is a diagram in schematic form illustrating the system for controlling the supply of molten adhesive to the gluepot of the molten adhesive applicator of FIGS. 1 to 7.

DESCRIPTION OF THE PREFERRED EMBODIMENT

Figure 1:
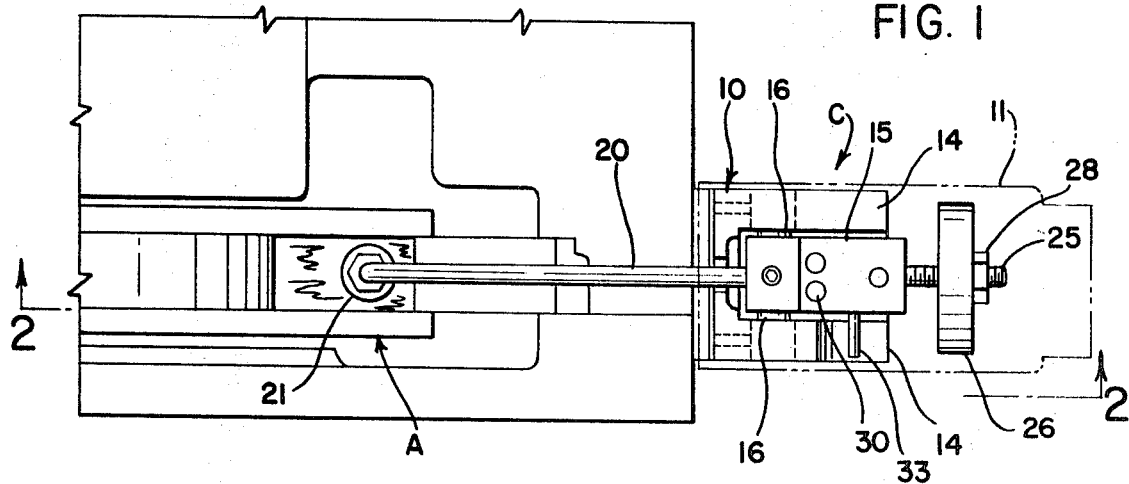
FIG. 1 is a fragmentary plan view of a wheel-type molten adhesive applicator having a liquid level sensing and control device embodying the invention showing the liquid level sensing element of the device in a normal position in solid lines and in a low level position in phantom lines.

Referring more particularly to the drawings there is shown a gluepot A for molten adhesive used in connection with an applicator wheel for applying deposits of molten adhesive on a translating surface. The level of the molten adhesive within the gluepot A is controlled by valve B which is opened in response to a low-level signal from a level control device C embodying the invention.

The device C comprises a metal base block 10 which is mounted in a position closely adjacent the gluepot A. The working parts are enclosed by a sheet metal cover 11 which is secured to the base block 10 by standoffs 12 and screws 13. The base block 10 has a bifurcated upper portion with trunnion arms 14 between which a pivot block 15 is supported. The pivot block 15 is journaled on two threaded coaxial fixed pivot pins 16 at its opposite ends one of which is threadedly secured in each trunnion arm 14, and each of which extends inwardly into a mating bore 17 in the pivot block 15. The pins 16 are journaled in the respective bores 17 in the pivot block 15 by means of Teflon bearings 18 and are axially adjustable to accurately position the pivot block 15. The pins 16 are locked in position by means of lock screws in the respective trunnion arms 14 and brass plugs which are forced radially against the threads of the pins 16.

An angularly bent lever arm 20 is secured by a setscrew in one end of the pivot block 15 and extends into the interior of the gluepot A. The outer end of the arm 20 is bent so as to be generally perpendicular to the surface of the molten adhesive. A sensing member in the form of a solid cylindrical metal displacer 21 is secured on the end of the lever arm 20 and is adapted to enter and penetrate the surface of the liquid in the gluepot A and to displace a substantial volume of the liquid, assuming that the liquid level is spaced sufficiently from the gluepot's floor. The displacer is formed of a material preferably having a density equal to or greater than that of the liquid in the gluepot A so that in a free state it would not float in the molten adhesive. Aluminum has been found to be particularly suitable. Alternatively the displacer may be coated with a low friction coating such as Teflon to reduce the tendency of the molten adhesive to adhere to its surface. Also the entire displacer may be formed of Teflon if desired.

A balance arm 25 is secured by a setscrew to the other end of the pivot block 15 on the opposite side of the pivot axis. The balance arm 25 carries a counterweight 26 which is adjustably secured on the opposite end of the balance arm by a threaded connection and which is positively located in the desired counterbalancing position by a stopnut 28. The counterweight's position relative to the axis of the pivot pin 16 is selected so as to supply a greater force on its side of the axis of the pivot when the displacer displaces a predetermined amount of the molten adhesive. When this occurs the displacer will rise with the liquid level and pivot the pivot block accordingly so as to provide to the pivot block a continuous signal indicating the liquid level in the gluepot.

A switch arm 30 in the form of a thin rod is connected to the pivot block 15 by a setscrew and is adapted to move with the block 15 in response to the liquid level signal transmitted from the displacer 21. A magnet 32, secured to the lower end of the switch arm 30, (FIG. 1) is adapted for movement with the pivot block 15 through an arcuate path of travel.

Figure 2:
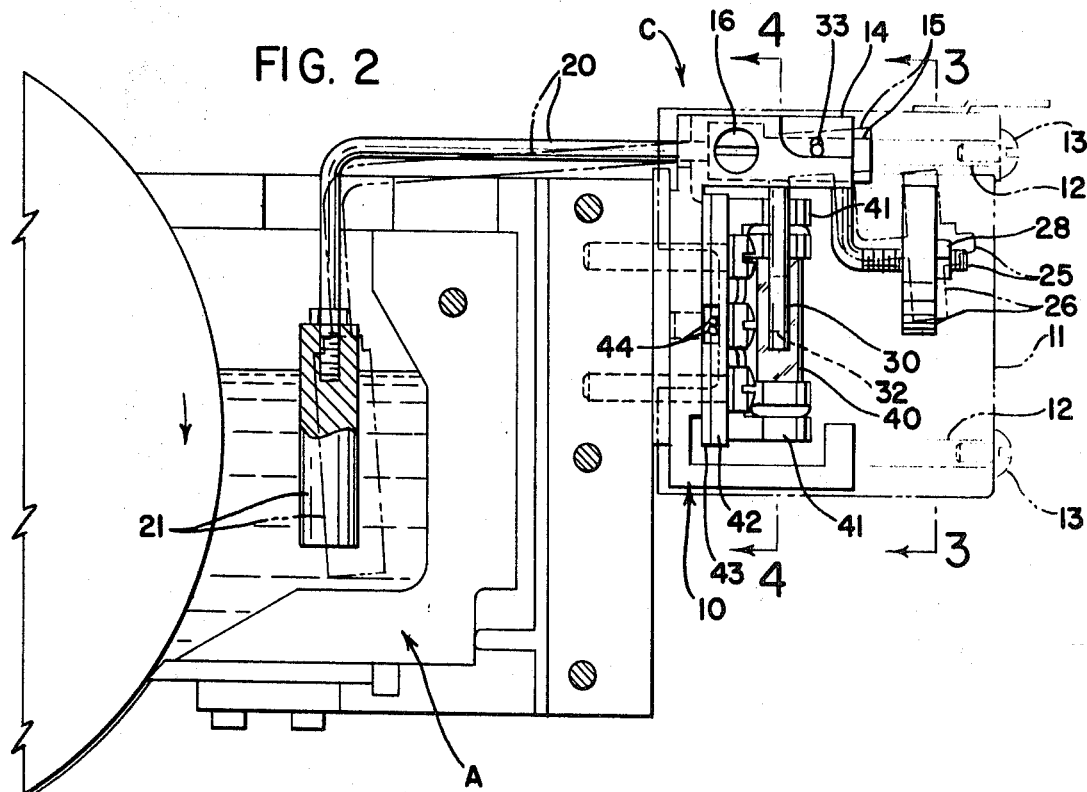
FIG. 2 is a fragmentary sectional view taken on the line 2—2 of FIG. 1.

The pivotal movement of the pivot block is limited by a stop 33 located thereon which engages one of the bifurcations 14 of the base block 10 to limit the clockwise movement of the pivot block 15 as indicated in FIG. 2. The magnet is adapted while in the limit position shown in FIG. 2 to actuate a switch mechanism located in a magnet-operated mercury-type switch cell 40. The switch cell 40 is of known construction and forms no part of the invention by itself. In the embodiment shown the switch cell is a commercial product identified by the trade designation "6–83" and is available from the Mercoid Corporation located in Chicago, Illinois. The switch cell 40 is carried by conventional mounting clips 41 which engage the ends thereof and which are attached to an insulator pad 42. The pad 42 in turn is connected to another insulator pad 43 which is secured to the wall of the base block 10.

The electrical leads 44 from the switch cell 40 extend through the insulator pads 42 and 43 and are connected to a solenoid 45 that controls a valve 46 which in turn supplies air under pressure to the valve B when the contacts of the switch cell 40 are closed. The valve releases molten adhesive from a melting-unit reservoir into the gluepot A. It will be seen that the position of the switch arm 30 and magnet 32 shown in solid lines in FIG. 2 is such that the magnetic field of force is closely adjacent the contacts of the magnetic switch cell 40 so that the switch contacts are opened utilizing only minute mechanical force from the lever mechanism itself as supplied by the liquid head tending to displace the displacer 21. Accordingly, the operation of the device is not dependent upon the generation of a buoyant force capable of actuating a mechanically operated switch.

When the magnet 32 is carried by the switch arm to the position corresponding to the phantom line position of displacer 21 in FIG. 2, wherein the magnet 32 is spaced from the switch cell 40, the magnetic field of force is not influencing the switch mechanism to an appreciable extend. Accordingly, the solenoid 45 will open the air valve 46 which in turn opens the control valve B and more molten adhesive will flow into the gluepot A. The flow will continue until the displacer 21 again moves the magnet 32 to the limit position adjacent the switch cell 40 whereupon the solenoid 45 will be deenergized and the valve 46 will be closed. This arrangement assures a relatively uniform and exact liquid level in the reservoir A at all times.

Because of the relatively large mass of the displacer 21 as compared, for example, to a float-type level control mechanism, and because of the particular geometry of the counterbalanced lever mechanism, the device has an inherent dampened response characteristic that enables it to ignore transient variation in liquid level due to vigorous agitation etc. Thus the response to a low-level condition is not erratic or abrupt as in the case of a float, and the normal level signal will be transmitted without tending to overshoot and cause the valve 46 to fluctuate several times between its open and closed positions before finally remaining closed.

A particular advantage is that the displacer will "failsafe" in the event that an excessive quantity of adhesive solidifies on its surface above the liquid level line. This accumulation merely causes greater displacement of liquid which makes the valve 46 shut off at a lower liquid level after filling the gluepot A.

While the invention has been shown as used in connection with hotmelt adhesive equipment using an applicator wheel, it is also useful in connection with gun-type applicators etc. Also the invention is not limited to use in connection with hotmelt adhesives but may be used to advantage in the control of liquid levels in the case of a great variety of different liquids. The advantages are particularly material where the liquid level must be controlled or the liquid must be maintained under conditions of high turbulence.

While the invention has been shown and described with reference to a specific embodiment thereof, this is intended only for the purpose of illustration rather than limitation and other variations and modifications will become apparent to those skilled in the art within the intended spirit and scope of the invention as herein specifically illustrated and described. Accordingly the patent is not to be limited in scope and effect to the preferred form of the invention shown herein nor in any way that is inconsistent with the extend that the progress in the art has been advanced by the invention.

We claim:

1. A device for sensing and controlling the level of a molten liquid hotmelt adhesive in a heated reservoir, said adhesive having a tendency to accumulate on the surface of an object immersed therein, said device comprising a lever having an axis of pivotal support, a sensing element secured to an arm of said lever and adapted to enter and displace a volume of said liquid adhesive, said element having a density equal to or greater than that of said liquid adhesive such that in a free condition it would sink in said liquid adhesive, the relative density of said sensing element to that of said liquid adhesive rendering it substantially insensitive to the accumulation of degraded adhesive thereon and to sudden variations in the level of liquid adhesive, a counterweight secured to an arm of said lever to counterbalance said sensing element when the force of said volume of displaced liquid adhesive is acting on said element, and means operatively associated with said lever for controlling the supply of liquid adhesive to said heated reservoir in response to the position of said sensing element.

2. A device as defined in claim 1 wherein said sensing element is of solid elongated form and is from about 3 to 6 times longer than its mean thickness.

3. A device as defined in claim 2 wherein said sensing element is formed of metal and has a smooth cylindrical exterior.

4. A device as defined in claim 1 wherein said means operatively associated with said lever includes a magnet connected to said lever and an electrical switch operable by said magnet.

5. A device as defined in claim 4 wherein liquid to maintain said liquid level is supplied in response to air pressure and wherein said means operatively associated with said lever includes an air valve for controlling said air pressure and a solenoid for operating said valve, said solenoid being energized by said switch.

6. The device of claim 1 in combination with apparatus for applying a molten adhesive to a translating surface.

7. A device as defined in claim 1 wherein said sensing element has a geometry such that only a relatively small amount of adhesive can accumulate thereon.